UNITED STATES PATENT OFFICE.

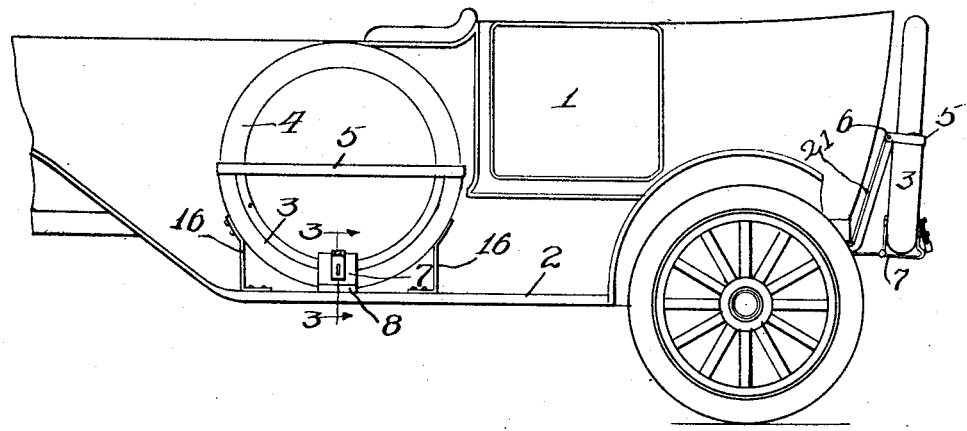
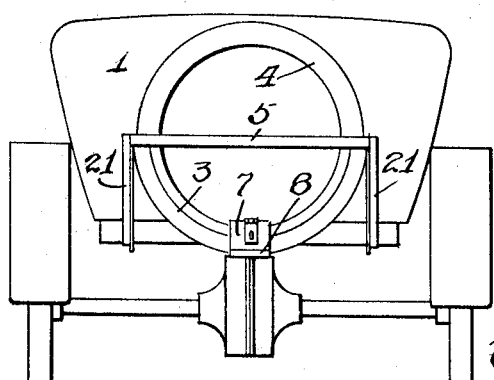
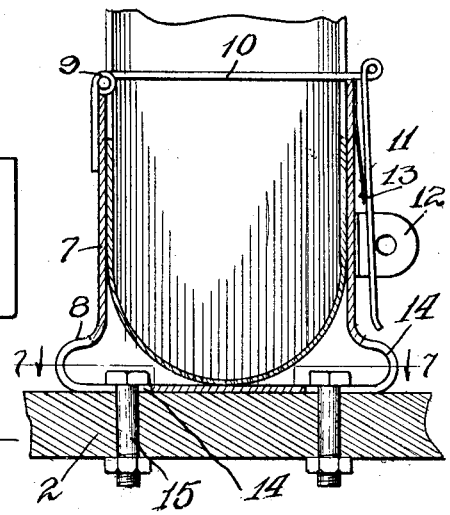
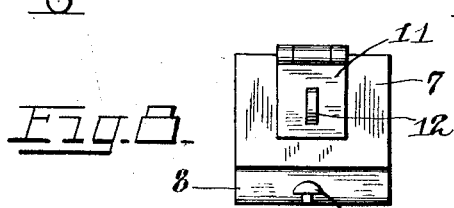

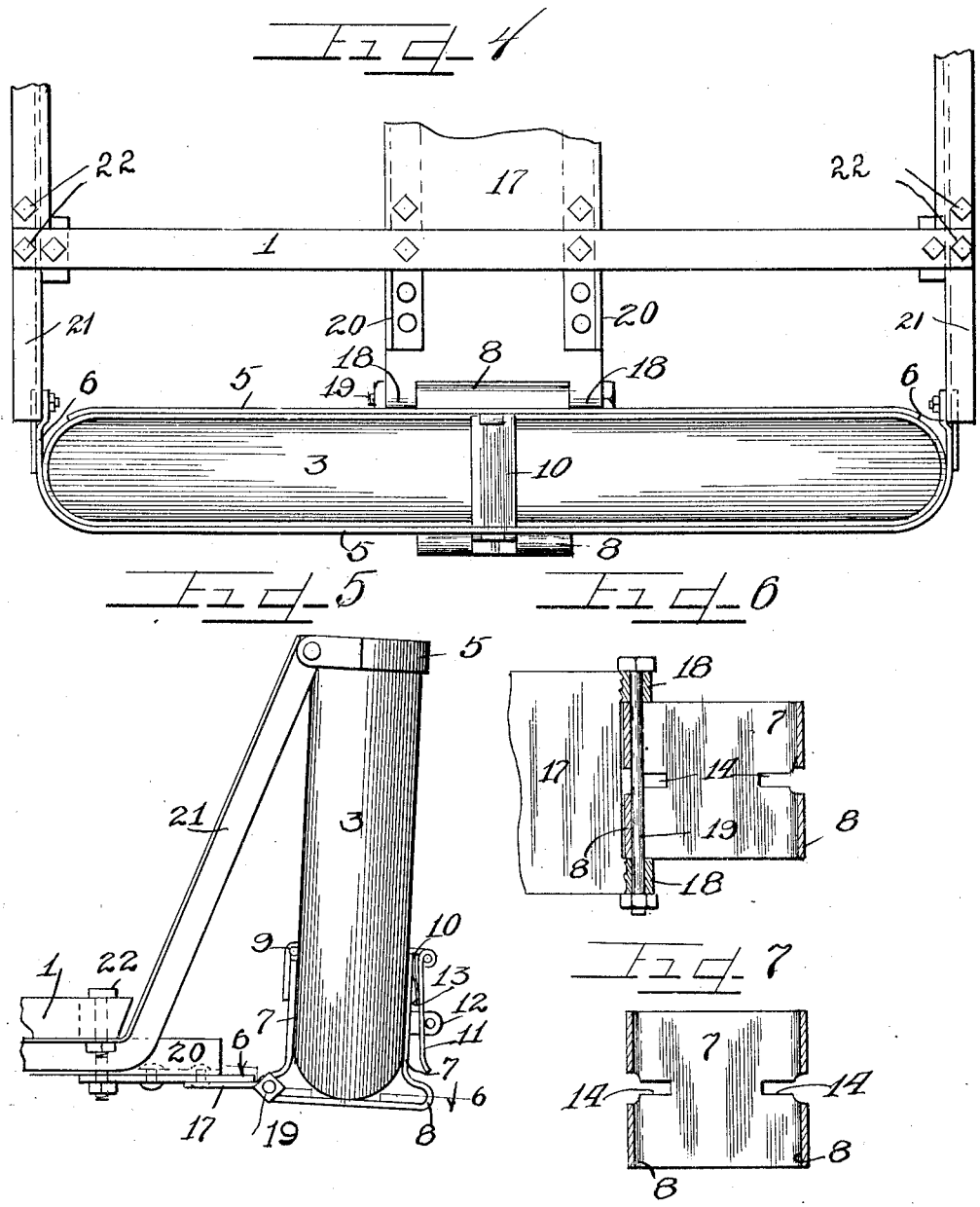

WALTER R. GREEN, OF CHICAGO, ILLINOIS.

TIRE-CARRIER.

1,352,595.  Specification of Letters Patent.  Patented Sept. 14, 1920.

Application filed September 10, 1915. Serial No. 50,037.

*To all whom it may concern:*

Be it known that I, WALTER R. GREEN, a citizen of the United States, and a resident of the city of Chicago, in the county of Cook and State of Illinois, have invented certain new and useful Improvements in Tire-Carriers; and I do hereby declare that the following is a full, clear, and exact description of the same, reference being had to the accompanying drawings, and to the numerals of reference marked thereon, which form a part of this specification.

This invention relates to an improved type of tire carrier practically universal in adaptation to a car, inasmuch as the same may be connected either at the rear thereof or at the side on one of the running boards, if so desired.

It is an object therefore of this invention to construct a tire carrier which, by a few simple changes in the means of attachment, may be connected either at the rear or on the side of a motor car.

It is also an object of this invention to construct a tire carrier adapted to receive and support a tire therein with mechanisms for locking the tire in the carrier, said carrier and locking mechanisms capable of being used with different forms of attaching means for use of the tire carrier in different positions on a motor car.

It is furthermore an object of this invention to construct an improved type of tire carrier having a plate welded to a curved semi-circular carrier element, and provided with hinge locking members to lock a tire in the carrier element and readily adapted for connection by different means upon a motor car in different positions thereon.

It is finally an object of this invention to construct an improved type of tire carrier simple in design and construction and readily attachable upon a motor car.

The invention (in a preferred form) is illustrated in the drawings and hereinafter more fully described.

In the drawings:

Figure 1 is a fragmentary side elevation of a motor car illustrating a tire carrier embodying the principles of my invention connected both at the rear and on the side thereof.

Fig. 2 is a rear elevation of the motor car showing the tire carrier thereon.

Fig. 3 is a detail section taken on line 3—3 of Fig. 1.

Fig. 4 is a top plan fragmentary view of the tire carrier attached at the rear of the motor car with the body of the car omitted.

Fig. 5 is an enlarged side elevation showing the tire carrier connected at the rear of the motor car.

Fig. 6 is a detail section taken on line 6—6 of Fig. 5, with parts omitted.

Fig. 7 is a detail section taken on line 7—7 of Fig. 3, with parts omitted.

Fig. 8 is a front elevation of the U-plate on the base of the curved tire carrier element.

As shown in the drawings:

The motor car, only a fragmentary portion of which is shown, is denoted as a whole by the reference numeral 1, and is provided, as usual, with a running board 2, clearly shown in Fig. 1. The tire holder consists of a semi-circular channel member 3, constituting a carrier element, into which a tire 4, is placed, and secured in any suitable manner. Across the upper end of said carrier element are reinforcing bars 5, disposed on each side of said element to permit a tire to be inserted therebetween. As clearly shown in Figs. 4 and 5, the outer reinforcing bar 5 is extended around the ends of the carrier element 3, and is offset slightly to provide ears 6 apertured to permit the detachable attachment thereto of brace bars or other means for holding the carrier element in place. Brazed or welded or otherwise secured to the lower central portion of the carrier element 3, is a yoke or U-shaped plate 7, which is substantially flat at its middle portion and at its sides bent outwardly, to form eyes or knuckles 8, above the plane of the bottom, which permits the bottom to lie flat on a running board or to receive a bolt therethrough to form one member of a hinge, as hereinafter described, and slots 14, are provided which extend transversely of the eyes or knuckles and open therethrough.

Connected by means of a hinge 9, to one side of said plate 7, is a bar 10, to which is hingedly connected a hasp 11, adapted to engage over an apertured lug 12, secured on the other side of said U-shaped plate 7, against the stress of a spring 13, to lock a tire in the carrier element 3, when a padlock is inserted through said apertured lug 12. When the carrier element is mounted upon the running board of a motor car such as shown in Figs. 1 and 3, bolts 15, are first inserted through slots 14, provided in the lower portion of said U-shaped plate 7, and engaged through the running board 2, of the car, thus affording a slotted standing base and rigid central support for the carrier element 3. Said slots 14 are substantially of T-shape on the upright portions 8, of said U-shaped plates 7, in order to accommodate the heads of the bolts 15, when inserted therein as clearly shown in Fig. 8. In order to additionally brace said carrier element, upright brace bars 16, are provided, which are connected by means of rivets or in any other suitable manner to the sides of the carrier element 3, and are also secured upon the running board in the manner shown in Fig. 1.

If, however, it is desired to mount the carrier at the rear of the motor car, a bracket plate 17, is first connected, as shown in Fig. 4, to the chassis or body frame of the motor car, and projects rearwardly therefrom, and at its outer end is provided with eyes 18, spaced apart sufficiently to receive one of the knuckles or eyes 8, of the plate 7, of the carrier element inserted therebetween to permit a bolt 19, to be inserted therethrough, affording an adjustable hinge connection therebetween. The plate 7, may thus be swung into any desired position to facilitate attachment of the tire carrier to the car. The connection between said plate 17, and the body or chassis frame of the motor car is effected by means of angle irons 20, provided for the purpose, the angle irons being directly connected to the chassis or body frame and riveted to said plate 17. An additional brace is provided for the ends of the carrier element, and for this purpose upwardly inclined brace bars 21, are connected by means of bolts $6_a$ and plates $6_b$ to the respective ears 6, heretofore described, and at their lower ends are bent to extend beneath the chassis or body frame for attachment thereto by means of bolts 22, or other suitable means. It will be noted that the bolts $6_a$, which connect the ears 6 with the brackets 21 readily are removable, for the purpose of allowing the carrier to be swung on the axis of the bolt 19 to a point where the tire may be removed or inserted without interfering with the automobile top when the latter is lowered and projects over the carrier. Furthermore, when it is found to be difficult to insert or remove a heavy tire, the carrier may be detached at its upper points and swung downwardly, whereby a tire readily may be inserted or removed, and the carrier then swung back on its pivot and connected in place.

The operation of the device is thought to be obvious from the description. However, the carrier forms an ideal means for carrying a spare tire on a motor car locked in a rigid manner without the use of unsightly straps or other devices sometimes used which allow the tire to sag into an unsightly position.

I am aware that the details of construction may be varied through a wide range without departing from the principles of this invention, and I therefore do not purpose limiting the patent granted otherwise than necessitated by the prior art.

I claim as my invention:

1. A tire carrier constructed for bottom or side attachment comprising a tire carrying member, a base plate having the tire carrying member resting upon the center portion thereof, and end portions of the base plate bent upwardly and secured to the side of the tire carrying member, said plate being provided at each side of the tire carrying member with a looped portion intermediate of the base portion and the upwardly extending portion so as to provide an enlarged base for bottom mounting and to provide a loop adapted to admit a horizontal bolt therethrough for side mounting.

2. In a tire carrier, the combination of a tire carrying member, a base plate secured to the tire carrying member and comprising a base portion extending transversely under the tire carrying member, upright end portions secured to the tire carrying member, a looped portion on each side of the tire carrying member intermediate of the base portion and the upright portion, a bolt opening through the base portion under the tire carrying member, and a slotted opening in the looped portion of the base plate adapted to admit a bolt through the bolt opening under the tire carrying member.

3. In a tire carrier constructed for bottom or side attachment, the combination of a support, a semi-circular tire holder, a base plate having the center portion thereof extending transversely under the semi-circular tire holder and having the end portions thereof extending upwardly and connected with the semi-circular tire holder and having looped portions at each side of the tire holder intermediate of the said center and end portions to provide a horizontal pivot bearing at each side of the tire holder, means for horizontally pivoting one of the looped portions to the said support, a cross brace connecting the ends of the semi-circular tire holder, and braces connecting the ends of the said cross brace with the support to prevent pivotal movement of the said tire holder on its horizontal pivot bearing.

4. A tire carrier, comprising a semi-circular channel member, brace bars extending substantially diametrically of and attached to the ends of said channel members and adapted to receive a tire inserted therebetween into said channel member, apertured ears at the ends of said channel member, braces adapted to be connected detachably to said ears and to a support for the carrier, a U-plate into which said channel member is secured, said U-plate having an integral flat portion providing a standing base for the tire carrier and having slots for attachment thereof to a support, outwardly looped portions formed on each side of said U-plate above its flat portion, and a hinge bar attached to one side of said U-plate and adapted to extend over said channel member to the other side of said U-plate and to be locked thereto to lock a tire in said channel member.

5. In a tire carrier, the combination with a semi-circular channeled tire holder, a brace connecting the ends of said tire holder, said brace being provided at each end with securing means, a bracket secured to said tire holder intermediate the ends thereof, a support, means for pivoting said bracket horizontally to said support, and brace bars detachably connecting said brace securing means to said support, whereby said tire holder may be swung on said pivot to permit ready insertion or removal of a tire.

6. A tire carrier, comprising a semi-circular channel member for supporting a tire, means at approximately the central circumferential point thereof for supporting said channel member pivotally, and a connection at each upper end of said channel member for securing said member detachably in upright and operative position, whereby said channel member may be swung on said pivot to permit ready insertion or removal of a tire.

7. In a tire carrier, the combination with a pair of spaced brackets, a semi-circular channel member having ears at its upper ends detachably connected to said brackets, a support, and means pivotally connecting the central part of said channel member to said support, whereby said channel member may be swung on said pivot to permit ready insertion or removal of a tire.

In testimony whereof I have hereunto subscribed my name in the presence of two subscribing witnesses.

WALTER R. GREEN.

Witnesses:
  CHARLES W. HILLS, Jr.,
  EARL M. HARDINE.